2,792,671
SANDBLAST NOZZLE ASSEMBLY

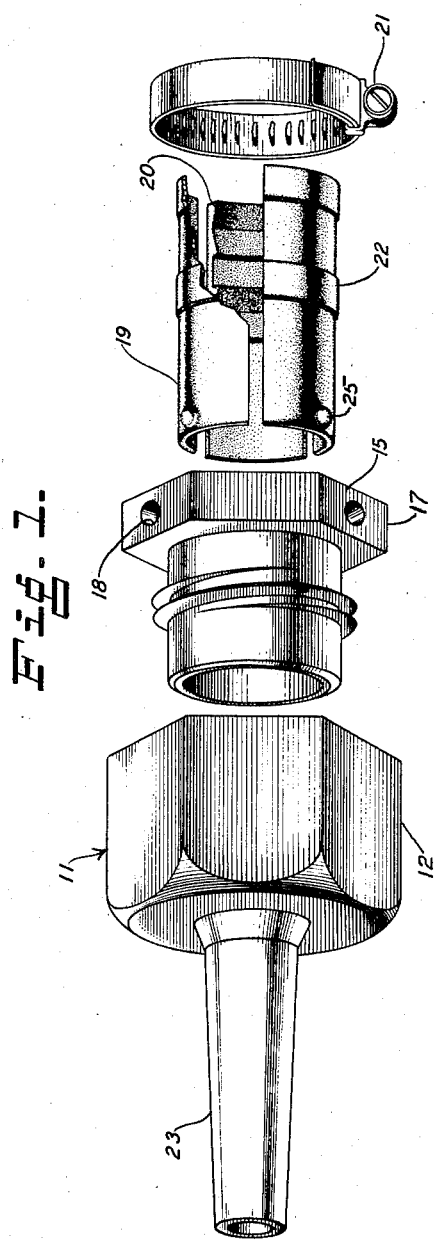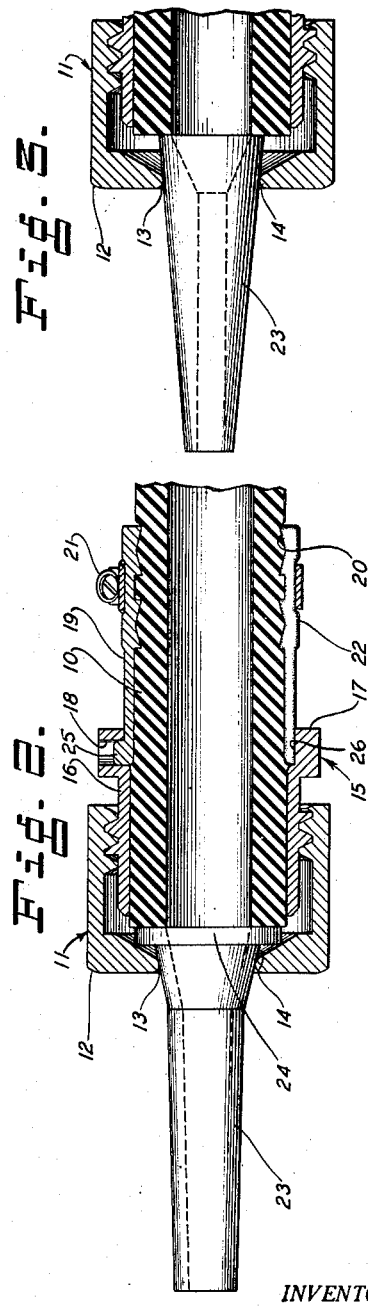
INVENTORS
EDWARD A. SPRIGG
RICHARD T. VENNER JR.
BY
ATTORNEY

Edward A. Sprigg and Richard T. Venner, Jr., Wadsworth, Ohio

Application December 30, 1955, Serial No. 556,622

1 Claim. (Cl. 51—11)

This invention relates to sand blast nozzles.

Where nozzles have been used on the end of rubber hose and the like for the purpose of directing a stream of compressed air carrying sand or some other abrasive, certain difficulties stemming from the construction of said nozzles have arisen.

Many presently known nozzles constrict the opening in the hose so as to diminish or restrict the flow of abrasives therethrough. Other nozzles tend to weaken the hose by reason of the clamping arrangement whereby the nozzle is secured to the hose. Still other nozzles are of such a specialized nature as to make it impossible to employ various types of terminal nozzle structures in the assembly.

Accordingly, it is an object of the present invention to provide a sand blast nozzle which will permit an unrestricted flow between the sand blast hose and the nozzle.

Another object of the present invention is to provide a sand blast nozzle assembly which may be secured to a hose without damaging the wall of said hose.

A further object of the present invention is to provide a nozzle assembly which will receive a wide variety of terminal nozzle structures for various blasting operations.

A feature of the present invention is its internally tapered nut construction which permits of self-centering of the terminal nozzle against the end of the rubber hose.

Another feature of the present invention is its external hose securing segment which grasp the hose without substantially invading the wall thereof.

A further feature of the present invention is its segmented hose grasping structure which permits of ready application to a hose.

The invention consists of the construction, combination and arrangement of parts, as herein illustrated, described and claimed.

In the accompanying drawing, forming a part hereof is illustrated one form of embodiment of the invention and in which:

Figure 1 is a somewhat exploded view in side elevation showing a complete embodiment of the present invention.

Figure 2 is a longitudinal section of the nozzle assembly shown in Figure 1.

Figure 3 is a fragmentary view of the terminal nozzle outlet of the nozzle assembly showing its application with a ceramic nozzle.

Referring to the drawing and specifically to Figures 1 and 2, 10 indicates the end of a length of rubber hose to which a sand blast nozzle assembly 11 may be attached. The nozzle assembly consists of an internally threaded nut member 12 having a reduced central opening 13 in the end thereof. The walls of the opening 13 are provided with a tapered bearing surface 14 for a hereinafter described purpose. An externally threaded nozzle body member 15 is received within the nut member 12. The nozzle body member 15 consists of a tubular portion 16 and a flanged portion 17. The flanged portion may be provided with flat surfaces such as are indicated in Figure 1 for the purpose of tightening the threaded connection between the nut 12 and the body portion 15. The flanged portion 17 is also provided with a plurality of bores 18 which extend through the wall of the said flanged portion of said body member 15 and in a direction normal thereto. A plurality of hose grasping inserts hereinafter referred to as segments 19 are disposed about the hose 10. The segments 19 are provided with outwardly extending cylindrical portions 25 at one end thereof which portions are received within the bores 18 of the body member 15. The segments are thus securely locked to the entire assembly 11.

The nozzle body member 15 is recessed, as indicated at 26 in Figure 2, to receive the segments 19. The recess 26 is of a depth which will bring the inner surface of the segments into the same plane as the inside diameter of the body member 15. By reason of the recess 26 the hose 10 will not be constricted beneath the segments where they enter the body member 15.

The segments 19 are provided with hose gripping serrations 20 upon the inner walls thereof, which serrations are adapted to invade the wall of the hose 10.

A clamp, such as is shown at 21 in Figures 1 and 2, may be slipped over the segments 19 for the purpose of forcing the serrations 20 into the wall of the hose 10. Bosses 22 are provided on the outside of each of the segments 19 for the purpose of laterally anchoring the clamp 21. A wide variety of terminal nozzles 23 may be employed with the present sand blast nozzle assembly. The terminal nozzle 23 may be a conventional steel nozzle such as is shown in Figures 1 and 2 or a ceramic nozzle as illustrated in Figure 3. The flange 24 of the conventional type steel terminal nozzle in bearing against the tapered surface 14 of the nut member 12 will center itself. The ceramic nozzle, which is provided with a tapered body, will automatically become centered within the opening 13 of the nut 12.

In assembling the device as shown in Figure 2, the hose 10 is slipped within the body portion 15 and allowed to project therebeyond a suitable distance. The segments 19 are fitted about the hose 10 and the extending cylindrical portions 25 slipped into the bores 18. The hose clamp 21 is then disposed about the segments 19 between the bosses 22 and tightened.

The terminal nozzle 23 is slipped through the opening 13 of the nut 12 and the nut tightened upon the body member 15 until a suitable pressure of the hose against the terminal nozzle 23 is obtained. The entire nozzle assembly is then ready for use. If it is desired to change the terminal nozzle 23 it is merely necessary to unscrew the nut 12 and substitute another terminal nozzle before replacing it on the body portion 15. It will be observed that the segments are collectively smaller in circumference than the diameter of the hose to which they are applied so that the tightening of the clamp 21 will cause them to bite into the wall of the said hose. Despite the gripping action of the segments, however, there is no reduction in the diameter of the bore of the hose.

It will thus be seen that an unrestricted flow of blasting material can pass through the hose and into the terminal nozzle.

Having thus fully described the invention, what is claimed as new and desired to be secured by Letters Patent of the United States, is:

A sand blast hose nozzle assembly comprising, an internally threaded nut, a reduced opening at the discharge end of said nut and an internal, tapered bearing surface adjacent the reduced opening, a flanged body portion threadably received by the nut, a plurality of bores in the flanged portion of the body member, a terminal nozzle carried by the nut within the reduced opening and extending therefrom, a plurality of hose conforming segments, an outwardly extending portion on each segment engageable with a bore in the body member, said segments extending rearwardly thereof, serrations formed integral with the inner surface of the segments spaced from the intake end thereof and clamp means overlying the serrated portion of the segments for securing the segments to the said hose.

References Cited in the file of this patent

UNITED STATES PATENTS

| | | |
|---|---|---|
| 1,876,639 | Disler et al. | Sept. 13, 1932 |
| 2,005,613 | Davis et al. | June 18, 1935 |
| 2,008,871 | Marvin | July 23, 1935 |
| 2,038,249 | Stoody | Apr. 21, 1936 |
| 2,333,264 | McDermott | Nov. 2, 1943 |
| 2,717,476 | Myers | Sept. 13, 1955 |

FOREIGN PATENTS

| | | |
|---|---|---|
| 838,671 | France | Dec. 16, 1938 |